(12) United States Patent
Ying et al.

(10) Patent No.: US 10,144,478 B2
(45) Date of Patent: Dec. 4, 2018

(54) PRESSURE CONTROL STEERING

(71) Applicant: Hangzhou Chic Intelligent Technology Co., Ltd., Hangzhou, Zhejiang Province (CN)

(72) Inventors: Jiawei Ying, Hangzhou (CN); Yunfei Lin, Hangzhou (CN)

(73) Assignee: HANGZHOU CHIC INTELLIGENT TECHNOLOGY CO., LTD., Hangzhou (CN)

( * ) Notice: Subject to any disclaimer, the term of this patent is extended or adjusted under 35 U.S.C. 154(b) by 18 days.

(21) Appl. No.: 15/408,322

(22) Filed: Jan. 17, 2017

(65) Prior Publication Data
US 2018/0148121 A1 May 31, 2018

(30) Foreign Application Priority Data

Nov. 25, 2016 (CN) .......................... 2016 1 1056462
Dec. 17, 2016 (CN) .......................... 2016 1 1222975

(51) Int. Cl.
| | |
|---|---|
| *B60K 11/00* | (2006.01) |
| *B60L 15/00* | (2006.01) |
| *G01L 5/00* | (2006.01) |
| *B62K 11/00* | (2006.01) |
| *B60L 15/20* | (2006.01) |
| *G01L 5/22* | (2006.01) |

(52) U.S. Cl.
CPC .......... *B62K 11/007* (2016.11); *B60L 15/2036* (2013.01); *G01L 5/225* (2013.01); *B62K 2204/00* (2013.01)

(58) Field of Classification Search
CPC ....... B62K 11/00; B62K 11/007; B60L 15/00; B60L 15/2036; G01L 5/00; G01L 5/225
See application file for complete search history.

(56) References Cited

U.S. PATENT DOCUMENTS

| | | |
|---|---|---|
| 3,338,328 A | 8/1966 | Cataldo |
| 3,876,025 A | 4/1975 | Green |
| (Continued) | | |

FOREIGN PATENT DOCUMENTS

| | | |
|---|---|---|
| CN | 2061469 U | 9/1990 |
| CN | 2327419 Y | 7/1999 |
| (Continued) | | |

OTHER PUBLICATIONS

M. Sasaki et al., *Steering Control of the Personal Riding-type Wheeled Mobile Platform (PMP)*, IEEE (Dec. 5, 2005).
(Continued)

*Primary Examiner* — Yonel Beaulieu

(57) ABSTRACT

A personal transport vehicle may include a first wheel and a second wheel, a first motor configured to drive the first wheel, and a second motor configured to drive the second wheel. The vehicle may also include at least one platform for supporting a driver, a plurality of pressure sensors to detect pressure applied by the driver on the platform, and a control circuit coupled to the plurality of pressure sensors to determine a pressure differential across the plurality of pressure sensors. The control circuit may generate, based on the pressure differential, control signals for the first motor and the second motor to drive the first wheel and the second wheel to turn the vehicle.

21 Claims, 4 Drawing Sheets

(56) References Cited

U.S. PATENT DOCUMENTS

| | | |
|---|---|---|
| 4,484,648 A | 11/1984 | Jephcott |
| 5,274,576 A | 12/1993 | Williams |
| 5,577,567 A | 11/1996 | Johnson et al. |
| 5,621,643 A | 4/1997 | Nakagami et al. |
| 5,628,379 A | 5/1997 | Watkins |
| 5,644,204 A | 7/1997 | Nagle |
| 5,682,132 A | 10/1997 | Hiroyoshi et al. |
| 5,701,965 A | 12/1997 | Kamen et al. |
| 5,757,161 A | 5/1998 | Ikkai et al. |
| 5,791,425 A | 8/1998 | Kamen et al. |
| 5,819,866 A | 10/1998 | Smith et al. |
| 5,960,900 A | 10/1999 | Cheng |
| 6,039,142 A | 3/2000 | Eckstein et al. |
| 6,050,357 A | 4/2000 | Staelin et al. |
| 6,240,356 B1 | 5/2001 | Lapke |
| 6,288,505 B1 | 9/2001 | Heinzmann et al. |
| 6,302,230 B1 | 10/2001 | Kamen et al. |
| 6,367,817 B1 | 4/2002 | Kamen et al. |
| 6,408,240 B1 * | 6/2002 | Morrell .................. A63C 17/12 180/197 |
| 6,538,411 B1 | 3/2003 | Field et al. |
| 6,561,294 B1 | 5/2003 | Kamen et al. |
| 7,090,040 B2 | 8/2006 | Kamen et al. |
| 7,138,774 B2 | 11/2006 | Negoro et al. |
| 7,240,908 B2 | 7/2007 | Sankrithi |
| 7,275,607 B2 | 10/2007 | Kamen et al. |
| 7,293,622 B1 | 11/2007 | Spital |
| 7,363,993 B2 | 4/2008 | Ishii |
| 7,367,572 B2 | 5/2008 | Jiang |
| 7,407,187 B2 | 8/2008 | Kakinuma et al. |
| 7,424,927 B2 | 9/2008 | Hiramatsu |
| 7,481,291 B2 | 1/2009 | Nishikawa |
| D601,922 S | 10/2009 | Imai et al. |
| 7,703,568 B2 | 4/2010 | Ishii |
| 7,775,534 B2 | 8/2010 | Chen et al. |
| 7,958,956 B2 | 6/2011 | Kakinuma et al. |
| 7,963,352 B2 | 6/2011 | Alexander |
| 8,157,274 B2 | 4/2012 | Chen |
| 8,459,668 B2 | 6/2013 | Yoon |
| 8,738,278 B2 | 5/2014 | Chen |
| 9,148,077 B2 * | 9/2015 | Henderson ............. H02N 15/00 |
| 9,188,984 B2 | 11/2015 | Kamen et al. |
| 9,254,759 B1 * | 2/2016 | Henderson ............. B60L 13/04 |
| 9,352,665 B2 * | 5/2016 | Melvin .................. B60L 13/04 |
| D807,457 S * | 1/2018 | Desberg ................. D21/763 |
| 2003/0094315 A1 * | 5/2003 | White .................. B60L 8/00 180/2.2 |
| 2004/0005958 A1 | 1/2004 | Kamen et al. |
| 2006/0260857 A1 | 11/2006 | Kakinuma et al. |
| 2007/0084662 A1 | 4/2007 | Oikawa |
| 2007/0273118 A1 | 11/2007 | Conrad |
| 2008/0084175 A1 * | 4/2008 | Hollis .................. B25J 5/007 318/568.12 |
| 2008/0147281 A1 | 6/2008 | Ishii et al. |
| 2009/0032323 A1 | 2/2009 | Kakinuma et al. |
| 2009/0105908 A1 | 4/2009 | Casey et al. |
| 2010/0025139 A1 | 2/2010 | Kosaka et al. |
| 2010/0114468 A1 | 5/2010 | Field et al. |
| 2010/0121538 A1 | 5/2010 | Ishii et al. |
| 2010/0222994 A1 | 9/2010 | Field et al. |
| 2010/0225080 A1 | 9/2010 | Smith |
| 2012/0035809 A1 | 2/2012 | Kosaka |
| 2012/0166048 A1 | 6/2012 | Inoue et al. |
| 2014/0265690 A1 * | 9/2014 | Henderson ............. H02N 15/00 310/90.5 |
| 2014/0305714 A1 * | 10/2014 | Huang .................. B60L 9/00 180/2.1 |
| 2016/0068056 A1 * | 3/2016 | Burtov .................. B62M 6/60 180/65.51 |

FOREIGN PATENT DOCUMENTS

| | | |
|---|---|---|
| CN | 1241483 A | 1/2000 |
| CN | 101219275 A | 7/2008 |
| CN | 101362018 B | 6/2010 |
| CN | 101229426 B | 12/2010 |
| CN | 101920728 A | 12/2010 |
| CN | 102000429 A | 4/2011 |
| CN | 101843974 B | 8/2011 |
| CN | 202070117 U | 12/2011 |
| CN | 102602481 A | 7/2012 |
| CN | 102616310 A | 8/2012 |
| CN | 102139733 B | 11/2012 |
| CN | 102275621 B | 8/2013 |
| CN | 203158157 U | 8/2013 |
| CN | 102614652 B | 7/2014 |
| CN | 102514662 B | 4/2015 |
| CN | 102514663 B | 5/2015 |
| CN | 105446337 A | 3/2016 |
| CN | 105711702 A | 6/2016 |
| CN | 205345206 U | 6/2016 |
| CN | 105905205 A | 8/2016 |
| CN | 105947042 A | 9/2016 |
| CN | 205589405 U | 9/2016 |
| DE | 198 20 059 A1 | 11/1999 |
| DE | 103 19 177 A1 | 11/2004 |
| GB | 2 242 173 A | 9/1991 |
| JP | 2004-024614 A | 1/2004 |
| JP | 2004-276727 A | 10/2004 |
| JP | 2005-022631 A | 1/2005 |
| JP | 2005-094898 A | 4/2005 |
| JP | 2005-162060 A | 6/2005 |
| JP | 2006-001385 A | 1/2006 |
| WO | WO 03/068342 A1 | 8/2003 |
| WO | WO 2005/032926 A2 | 4/2005 |

OTHER PUBLICATIONS

English Language Abstract, CN 2061469 U.
English Language Abstract, CN 2327419 Y.
English Language Abstract, DE 198 20 059 Al.
English Language Abstract, CN 1241483 A.
English Language Abstract, JP 2004-024614 A.
English Language Abstract, JP 2004-276727 A.
English Language Abstract, DE 103 19 177 A1.
English Language Abstract, JP 2005-022631 A.
English Language Abstract, JP 2005-094898 A.
English Language Abstract, JP 2005-162060 A.
English Language Abstract, JP 2006-001385 A.
English Language Abstract, CN 101219275 A.
English Language Abstract, CN 101362018 B.
English Language Abstract, CN 101229426 B.
English Language Abstract, CN 101920728 A.
English Language Abstract, CN 102000429 A.
English Language Abstract, CN 101843974 B.
English Language Abstract, CN 202070117 U.
English Language Abstract, CN 102602481 A.
English Language Abstract, CN 102616310 A.
English Language Abstract, CN 102139733 B.
English Language Abstract, CN 102275621 B.
English Language Abstract, CN 203158157 U.
English Language Abstract, CN 102614652 B.
English Language Abstract, CN 102514662 B.
English Language Abstract, CN 102514663 B.
English Language Abstract, CN 105446337 A.
English Language Abstract, CN 105711702 A.
English Language Abstract, CN 205345206 U.
English Language Abstract, CN 105905205 A.
English Language Abstract, CN 205589405 U.
English Language Abstract, CN 105947042 A.

* cited by examiner

PRESSURE CONTROL STEERING

PRIORITY

This application claims the benefit of and priority to Chinese Application No. CN201611056462.0, filed Nov. 25, 2016, and Chinese Application No. CN201611222975.4 filed Dec. 27, 2016. The subject matter of the aforementioned applications is incorporated herein by reference.

TECHNICAL FIELD

The present disclosure relates generally to a pressure-control steering system for a vehicle, and particularly for a personal transport vehicle.

BACKGROUND

Recent years have seen the development of a variety of personal transport vehicles. Such vehicles, for example, hoverboards, scooters, and handled vehicles (such as Segway® vehicles), may be steered by shifts in a driver's position. The vehicle may recognize shifts in a driver's position and use data relating to the shifts in a driver's position to steer the vehicle in accordance with the driver's intentions. For example, when a driver leans forward, the vehicle may recognize the shift in position and adjust the motor speed such that the vehicle moves forward.

In some designs, a vehicle may recognize shifts in a driver's position based on gyroscope data. For example, a rotation of a platform positioned between two wheels may cause a gyroscope to turn, providing data indicating that a driver has moved. Though simple in principle, however, this design may be difficult to maintain and repair, and may be difficult to control at high speeds, creating a fall risk. In other designs, a vehicle may use pressure sensors to calculate a driver's center of gravity and identify movement away from the center of gravity, but data from these sensors may be skewed if the driver is, for example, carrying bags. This may be undesirable.

The vehicles and methods disclosed and claimed in this application are directed to addressing one or more of the possible drawbacks discussed above and/or other problems of the prior art.

SUMMARY

One aspect of the present disclosure is directed to a personal transport vehicle, which may include a first wheel and a second wheel, a first motor configured to drive the first wheel and a second motor configured to drive the second wheel. The vehicle may also include at least one platform for supporting a driver, a plurality of pressure sensors to detect pressure applied by the driver on the platform, and a control circuit coupled to the plurality of pressure sensors to determine a pressure differential across the plurality of pressure sensors. The control circuit may generate, based on the pressure differential, control signals for the first motor and the second motor to drive the first wheel and the second wheel to turn the vehicle.

Another aspect of the present disclosure is directed to a personal transport vehicle, which may include a first wheel and a second wheel, a first motor configured to drive the first wheel and a second motor configured to drive the second wheel. The vehicle may also include at least one platform for supporting a driver, a balance sensor to detect the tilt of the platform, a plurality of pressure sensors to detect pressure applied by the driver on the platform, and a control circuit coupled to balance sensor and to the plurality of pressure sensors to determine a platform tilt and a pressure differential across the plurality of pressure sensors. The control circuit may generate, based on the platform tilt and the pressure differential, control signals for the first motor and the second motor to drive the first wheel and the second wheel to turn the vehicle.

Yet another aspect of the present disclosure is directed to a method of controlling a personal transport vehicle. The method may include detecting a pressure applied by a drive on a platform of the vehicle using a plurality of pressure sensors and determining a pressure differential across the plurality of pressure sensors using a control circuit coupled to the plurality of pressure sensors. The method may further include generating, based on the pressure differential, control signals for a first motor and a second motor to drive a first wheel and a second wheel to turn the vehicle.

DETAILED DESCRIPTION

Figure 1:
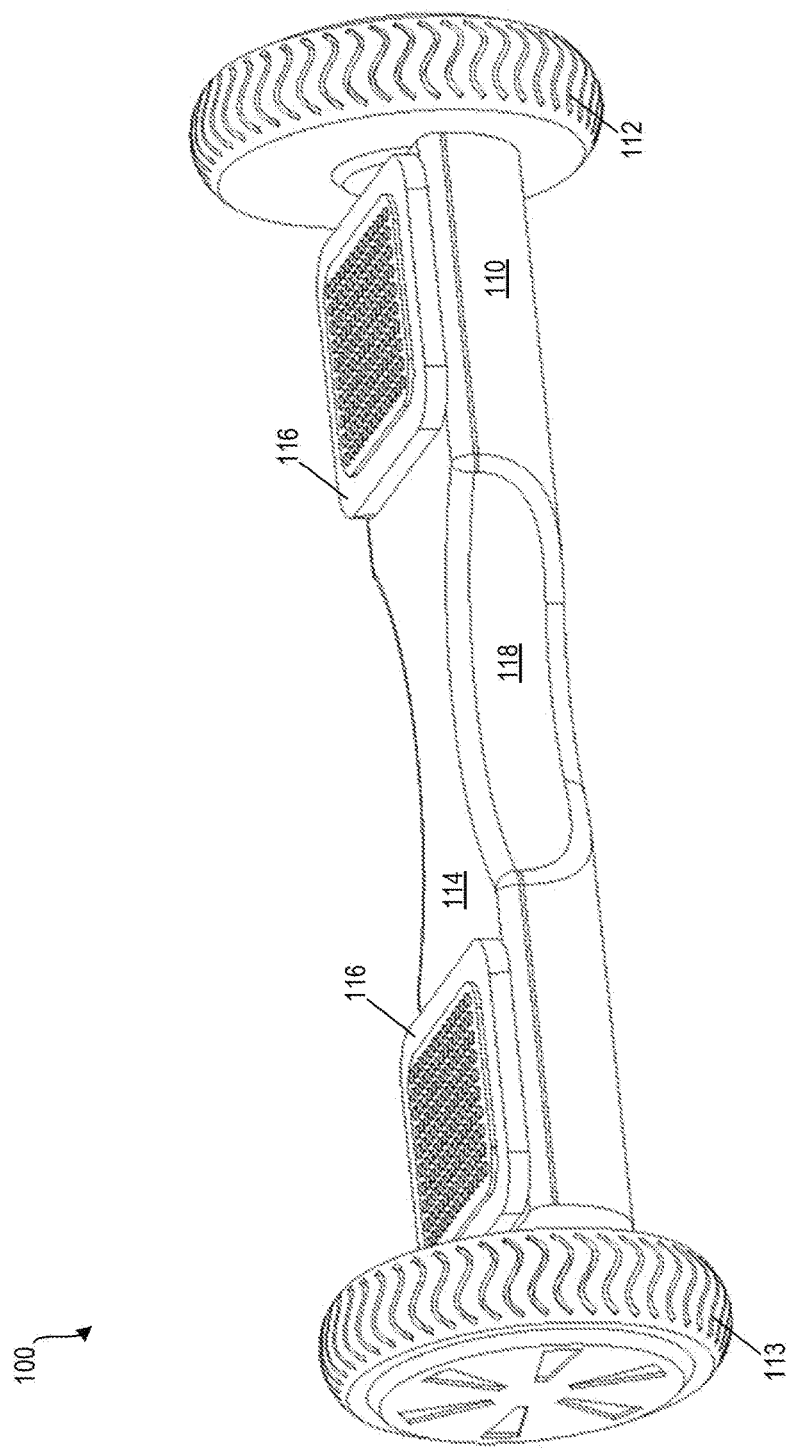
FIG. 1 is a diagrammatic illustration of an exemplary personal transport vehicle, according to an exemplary embodiment of the disclosure.

The disclosure is generally directed to a pressure-control steering system for controlling a vehicle based on pressure. FIG. 1 is a diagrammatic illustration of an exemplary personal transport vehicle 100, according to an exemplary embodiment of the disclosure. Vehicle 100 may be, for example, an electric vehicle, a fuel cell vehicle, or a hybrid vehicle. Vehicle 100 may be a personal transport vehicle intended for a single driver or may be configured to carry passengers. Vehicle 100 may be configured for a variety of driver stances (e.g., standing, sitting, crouching), and it is contemplated that vehicle 100 may include handlebars or other support devices.

In the exemplary embodiment shown in FIG. 1, vehicle 100 may include body 110, wheels 112 and 113, and platform 114, on which one or more support pads, such as footpads 116 may be positioned. Support pads are designed for supporting a driver or a person. Even though footpads 116 are described here as examples, the support pads may not be limited to footpads. For example, a person may be sitting on vehicle 100 via the support pads and operate the vehicle using hand operations.

Wheels 112 and 113 may be driven by one or more motors (not shown). Vehicle 100 may also include a control circuit configured to generate control signals for the motors to drive the wheels.

Body 110 and platform 114 may be composed of, for example, steel, alloys, carbon fiber, or other materials able to bear a desired amount of weight. Body 110 may be scaled to accommodate a desired riding stance for the driver, and may be shaped with one or more cutouts 118, as shown, to facilitate a driver carrying vehicle 100 or to decrease the weight of vehicle 100 Similarly, platform 114 may be configured in an hourglass shape, as shown in FIG. 1, or may be of any other shape. Platform 114 may be configured to support a driver so that a driver may ride upon platform 114 in a desired stance, e.g., with his feet facing in the same direction, different directions, in multiple positions. Platform 114 may also be configured to accommodate passengers or cargo.

Wheels 112 and 113 may be rotationally disposal on body 110. Wheels 112 and 113 may be inflated or solid, and may be sized to accommodate stability, speed, or other design considerations. As one of ordinary skill will recognize, vehicle 100 may include additional or fewer wheels without departing from the scope of the invention. In addition, wheels 112 and 113 may be positioned in different ways relative to body 110.

Wheels 112 and 113 may be driven. In addition, vehicle 100 may also include non-driven wheels, which may rotate freely. In some exemplary embodiments, each of wheel 112 and wheel 113 may be driven by a separate motor so that the rotation of wheel 112 and the rotation of wheel 113 may be independently controlled. Wheel 112 and wheel 113 may be driven by one or more A.C. motors or other types of motor. The motor(s) may be powered by one or more batteries or other power sources, which may be chargeable or replaceable.

In embodiments in which the rotation of wheel 112 and wheel 113 are separately controlled, the heading of vehicle 100 may be adjusted by rotating one wheel more quickly than the other. For example, in the embodiment shown in FIG. 1, if left wheel 112 rotates more quickly than right wheel 113, vehicle 100 will turn to the right. This movement may be described in terms of vehicle 100's yaw. Yaw describes the degree to which a vehicle turns about a vertical axis relative to a known point (e.g., the degree vehicle 100 departs from a past heading). For example, if vehicle 100 makes a right turn at a city intersection, it has yawed 90° to the right.

Varying the magnitude of the difference between the rotational speed of wheel 112 and the rotational speed of wheel 113 varies how quickly vehicle 100 will turn. The "quickness" or rate of the turn made by vehicle 100 may be described as the rate of change of yaw, which may be described as the angular velocity about a vertical axis of vehicle 100. The measured rate of change of yaw ("W(yaw)") at a given time of vehicle 100, may be measured according to known techniques, such as via one or more gyroscopes and/or gyroscope(s) and accelerometer(s). Where the difference between the rotational speed of wheel 112 and the rotational speed of wheel 113 is greater, W(yaw) will be greater, indicating vehicle 100 is turning more quickly.

The motors driving wheels 112 and 113 may each be controlled by control signals from the control circuit. In exemplary embodiments, the control circuit may include one or more proportional-integral-derivative (PID) controllers. The control signals controlling the motor driving wheel 112 may be different from the control signals controlling the motor driving wheel 113. The control signals controlling each of the motors driving wheels 112 and 113 may be pulse-width modulated (PWM) currents.

Vehicle 100 may include sensors that measure actual characteristics or posture of vehicle 100. The sensors may be, for example, balance sensors to detect the tilt of platform 114, sensors detecting the speed of vehicle 100, sensors detecting W(yaw), etc. Such sensors may include accelerometers, speedometers, odometers, gyroscopes, tilt sensors, temperature sensors, pressure sensors, magnetic sensors, and other sensors known in the art. Such sensors may be disposed in body 110 or elsewhere in vehicle 100. The control circuit may generate control signals based on data from the sensors and provide the control signals to the motors to vary the wheels' respective rotational speeds. The control circuit may vary the respective rotational speeds of wheels 112 and 113 in order to control and adjust characteristics of vehicle 100 to achieve desired characteristics of vehicle 100, based on e.g., targets set by the manufacturer, pre-selected driver preferences, real-time driver inputs, and/or input from the sensors of vehicle 100. For example, if a balance sensor of vehicle 100 indicates that platform 114 has tilted too far as compared to a target tilt set by the manufacturer, the control circuit may generate control signals to vary the wheels' rotation and return the tilt of platform 114 to acceptable levels.

Figure 2:
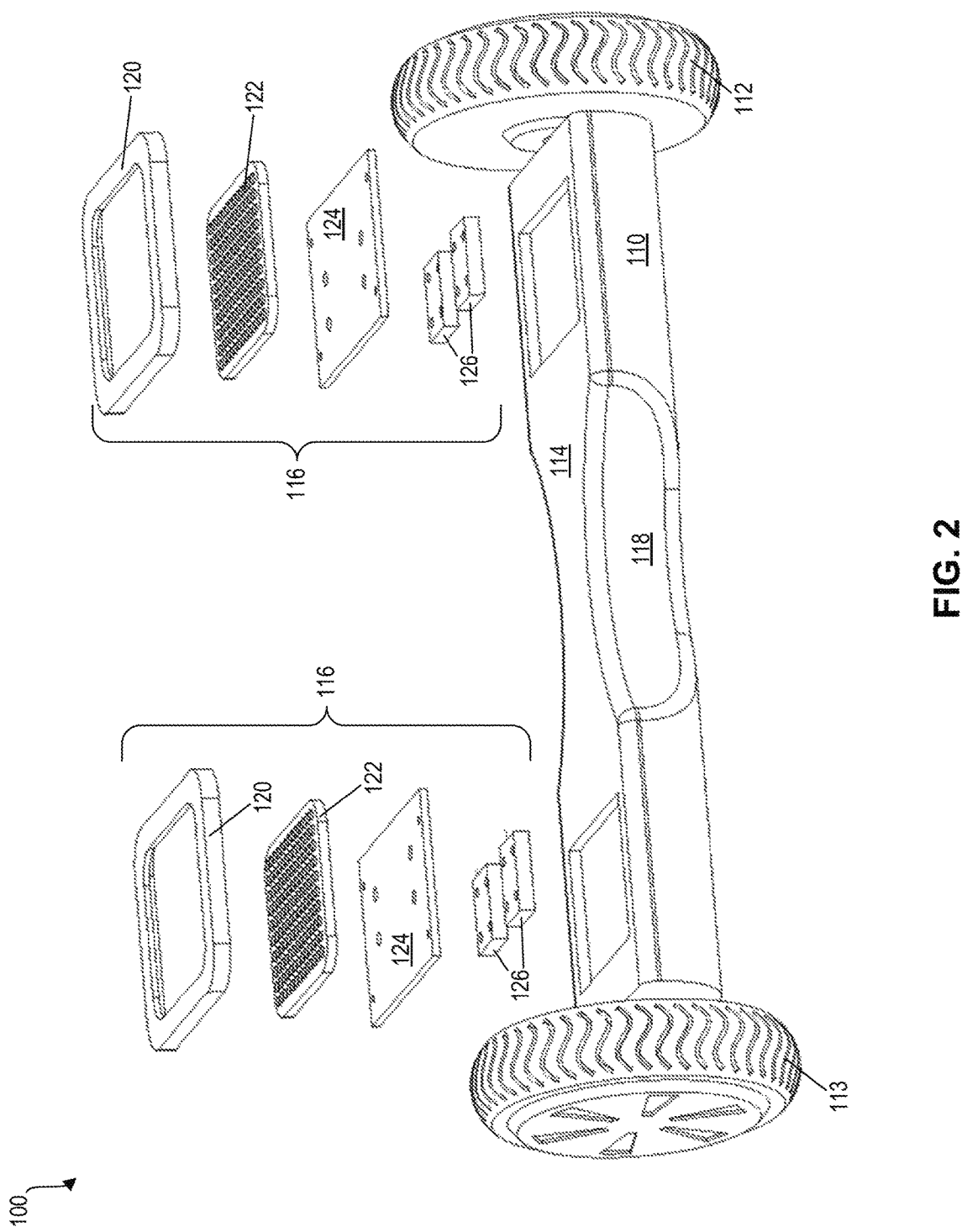
FIG. 2 is an exploded diagrammatic illustration of the footpads of an exemplary personal transport vehicle, according to an exemplary embodiment of the disclosure.

In exemplary embodiments, vehicle 100 may include a plurality of pressure sensors configured to detect pressure applied by the driver on platform 114. The data from pressure sensors 126 may be used to steer vehicle 100. Pressure sensors 126 may be included in or under footpads 116, which may be positioned on platform 114. As shown in FIG. 2, an exploded diagrammatic illustration of the footpads of an exemplary vehicle, footpads 116 may be composed of multiple parts. For example, each footpad 116 may include a cover 120, a soft pad 122, a hard pad 124, and one or more pressure sensors 126.

By way of example, cover 120 may be of plastic or metal, soft pad 122 may be of rubber or other cushioning material, and hard pad 124 may be of hard metal. It is contemplated that components of footpad 116 may be omitted or added. Each footpad 116 may further include one or more pressure sensors 126. Pressure sensors 126 may provide real-time data regarding the pressure applied by the driver on footpad 116. Each pressure sensor 126 may be associated with a single point, but it is also contemplated that a single pressure sensor may sense the pressure applied at multiple points.

Figure 3:
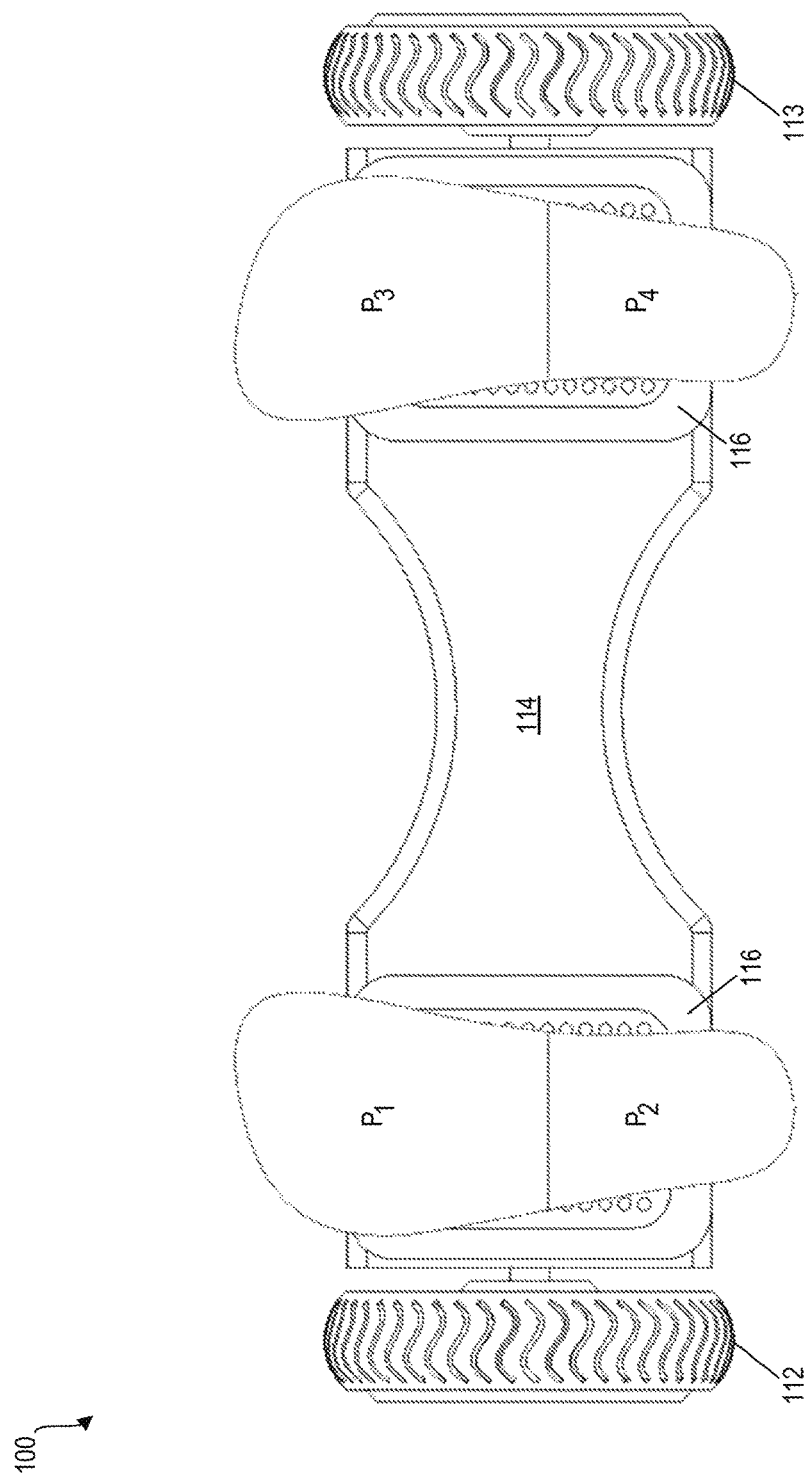
FIG. 3 is a diagrammatic illustration of the interaction between a driver's feet and the pressure sensors of an exemplary personal transport vehicle, according to an exemplary embodiment of the disclosure.

In an exemplary embodiment, pressure sensors 126 may be positioned to sense pressure at the front of a left footpad 116 ($P_1$), the rear of the left footpad 116 ($P_2$), the front of a right footpad 116 ($P_3$), and the rear of the right footpad ($P_4$). As shown in FIG. 3, a diagrammatic illustration of the interaction between a driver's feet and the pressure sensors of an exemplary vehicle, these positions may correspond to different portions of a driver's feet, for example, the front portion of the driver's left foot ($P_1$), the back portion of the driver's left foot ($P_2$), the front portion of the driver's right foot ($P_3$), and the back portion of the driver's right foot ($P_4$), in order to sense the pressure applied by different portions of the driver's feet. Alternatively or in addition, pressure sensors 126 may be positioned to sense the pressure applied by other portions of the driver's feet, for example, the inner and outer portions of the driver's feet.

In exemplary embodiments, vehicle 100 may be started and stopped according to whether a driver is applying pressure on platform 114. For example, if pressure sensors 126 detect no pressure, the motor driving wheel 112 and/or wheel 113 may not start or, if running, may be stopped.

In addition, the data from pressure sensors 126 may be used to steer vehicle 100 by pressure control. In embodiments of the present disclosure, data from pressure sensors 126 are compared to detect a driver-intended speed differential between the left and right wheels, rather than a weight distribution or the center of gravity of the driver as occurs in some existing devices. In other words, the driver may indicate, by applying different pressure on the pressure sensors, how much faster the left wheel should move than the right wheel, or vice versa, without necessarily trying to shift his/her weight or center of gravity across the vehicle, which may be difficult to do under certain circumstances (e.g., when the driver is carrying grocery bags in one hand).

Figure 4:
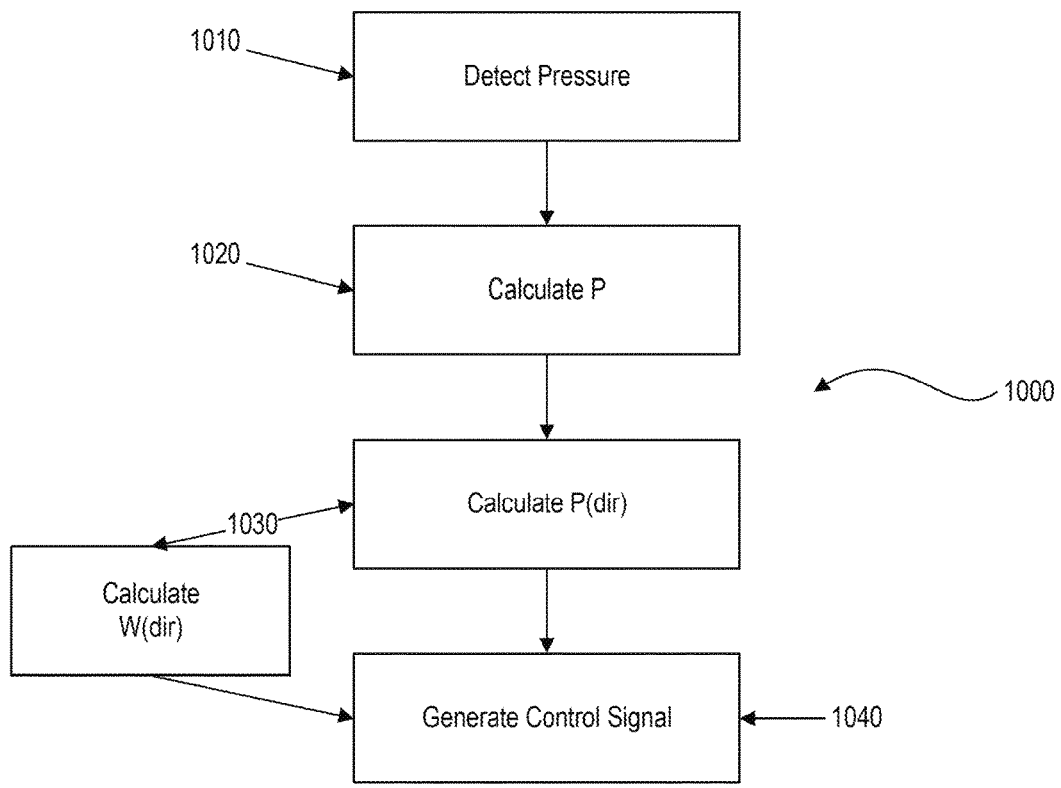
FIG. 4 is a flowchart illustrating an exemplary process for using pressure control to steer a personal transport vehicle, according to an exemplary embodiment of the disclosure.

FIG. 4 is flowchart illustrating an exemplary process 1000 for using pressure control to steer vehicle 100. First, in step 1010, the plurality of pressure sensors 126 may measure the pressure applied by the driver, and in step 1020, the pressure differential ("P") across pressure sensors 126 may be calculated by the control circuit or other known methods according to the formula: P=($P_1$–$P_2$)–($P_3$–$P_4$). The difference between $P_1$ and $P_2$ may provide the pressure differential across the driver's left foot, and the difference between $P_3$ and $P_4$ may provide the pressure differential across the driver's right foot. Thus, P may describe the pressure differential across each of the driver's feet. In step 1030, P can be used to determine a calibrated target change in yaw over time (angular velocity about the vertical axis), P(dir). P(dir) may be calculated by the control circuit or other known methods based both on the real-time pressure differential and the linear velocity of vehicle 100, according to the formula:

$$P(\text{dir})=P*(1.0-V/K_1),$$

where $K_1$ is the V feedback coefficient, and V is the linear velocity of vehicle 100, according to the following limitations:

$$V = \begin{cases} K1; & V > K1 \\ 0; & V < 0 \\ V; & 0 \leq V < K1 \end{cases}$$

V may be measured through known methods, such as via accelerometer data.

The control circuit may also calculate W(dir). In step 1030, W(dir), a calibrated measured change in yaw over time, may be calculated according to the formula: W(dir) =W(yaw)*(1.0+V/$K_2$), where W(yaw) is the measured yaw of vehicle 100, as previously discussed, and $K_2$ is the yaw rate of change (W(yaw)) feedback coefficient.

Using P(dir) and W(dir), in step 1040, the control circuit of vehicle 100 may generate control signals. The control signals may drive wheels 112 and 113 independently of one another, and may be based on P, the pressure differential applied by the driver. If, for example, the driver applies more pressure in the front-left sensor ($P_1$) than the rear-left sensor ($P_2$), the driver may be instructing vehicle 100 to make a right, forward turn. At the same time, if the driver applies more pressure in the front-right sensor ($P_3$) than the rear-right sensor ($P_4$), the differential between $P_3$ and $P_4$ may offset the intended turn. The magnitude of P, which reflects the difference between the left and right differentials, may dictate the speed or rate at which vehicle 100 should make the turn (i.e., the change in yaw over time W). For example, a greater P may cause vehicle 100 to turn more quickly than a smaller P. Such pressure control may allow the driver to steer intuitively without having to physically shift position (e.g., leaning the body forwards and backwards), which may improve driver balance and safety.

According to these equations, the calibrated target change in yaw over time (P(dir)) will be smaller and the calibrated measured change in yaw over time (W(dir)) will be greater when the linear velocity of vehicle 100 is greater. Thus, when vehicle 100 is moving at high speed, the control circuit may cause the yaw to adjust more slowly, improving driver control and the stability of vehicle 100. In contrast, when vehicle 100 is moving at low speed, the control circuit may cause the yaw to adjust more quickly.

In exemplary embodiments, the control signals may be based on additional inputs. For example, the control circuit may generate a first PWM current ("PWM1"), which may be used to adjust the tilt of platform 114 based on data from a balance sensor of vehicle 100, such as an accelerometer, a gyroscope, a tilt sensor, or other sensors known in the art. The control circuit may also generate a second PWM current ("PWM2"), which may be used adjust the angular velocity of platform 114 about an axis between wheels 112 and 113, based on data from one or more sensors of vehicle 100, such as an accelerometer, a gyroscope, a tilt sensor, or other sensors known in the art. The control circuit may also generate a third PWM current ("PWM3"), based on P(dir) and W(dir), as described above. The control signals may be based on all of PWM1, PWM2, and PWM3.

For example, the motor driving wheel 112 may be controlled by weighted control signals accounting for PWM1, PWM2, and PWM3, according to the formula: PWM(L)=f1(v)*PWM1+f2(v)*PWM 2+f3 (v)*PWM3.

Similarly, the motor driving wheel 113 may be controlled by weighted control signals accounting for PWM1, PWM2, and PWM3, according to the formula:PWM(R)=f1(v) *PWM1+f2(v)*PWM2–f3(v)*PWM3.

In each case, f1(v), f2(v), and f3(v) may be set based on device testing according to the formula: 0<f1(v)<1, 0<f2(v) <1, 0<f3(v)<1; f1(v)+f2(v)+f3(v)=1. It is contemplated that f1(v), f2(v), and f3(v) may be constants, or may be calculated as a function of V or other measured characteristics sensed by sensors of vehicle 100.

After the control signals have been provided to the motors driving wheels 112 and 113, the entire process may be repeated in order to dynamically control the steering of vehicle 100.

It will be apparent to those skilled in the art that various modifications and variations may be made to the disclosed vehicle and related methods. Though described with reference to a personal transport vehicle, the disclosure may also be applied to other contexts, such as toys and vehicles of other types. The disclosure may also be applied to pressure control systems in which pressure is applied by a driver's hand etc., rather than the driver's feet. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A personal transport vehicle comprising:
   a first wheel and a second wheel;
   a first motor configured to drive the first wheel;
   a second motor configured to drive the second wheel;
   at least one platform for supporting a driver;
   a plurality of pressure sensors configured to detect pressure applied by the driver on the platform; and
   a control circuit coupled to the plurality of pressure sensors and configured to determine a pressure differential across the plurality of pressure sensors;
   wherein the pressure differential compares the pressure detected in a first footpad and in a second footpad, the control circuit generates, based on the pressure differential, control signals for the first motor and the second motor to drive the first wheel and the second wheel to turn the vehicle.

2. The vehicle of claim 1, wherein the plurality of pressure sensors are respectively disposed in the first footpad and the second footpad.

3. The vehicle of claim 1, wherein the plurality of pressure sensors include at least two pressure sensors positioned under the first footpad and at least two pressure sensors under the second footpad, and the pressure differential compares the difference between the pressure detected by the two pressure sensors positioned under the first footpad and the difference between the pressure detected by the two pressure sensors positioned under the second footpad.

4. The vehicle of claim 1, wherein the control circuit includes a PID controller.

5. The vehicle of claim 1, wherein the control signals for the first motor are different from the control signals for the second motor.

6. The vehicle of claim 1, wherein the control signals are pulse-width modulated (PWM) currents.

7. The vehicle of claim 1, wherein the control circuit further generates control signals to stop the vehicle.

8. A personal transport vehicle comprising:
a first wheel and a second wheel;
a first motor configured to drive the first wheel;
a second motor configured to drive the second wheel;
at least one platform for supporting a driver;
a balance sensor to detect the tilt of the platform;
a plurality of pressure sensors configured to detect pressure applied by the driver on the platform; and
a control circuit coupled to the balance sensor and to the plurality of pressure sensors and configured to determine a platform tilt and a pressure differential across the plurality of pressure sensors;
wherein the pressure differential compares the pressure detected in a first footpad and in a second footpad, the control circuit generates, based on the platform tilt and the pressure differential, control signals for the first motor and the second motor to drive the first wheel and the second wheel to turn the vehicle.

9. The vehicle of claim 8, wherein the plurality of pressure sensors are respectively disposed in the first footpad and the second footpad.

10. The vehicle of claim 8, wherein the pressure differential compares the pressure detected in the first footpad and in the second footpad.

11. The vehicle of claim 8, wherein the plurality of pressure sensors include at least two pressure sensors positioned under the first footpad and at least two pressure sensors under the second footpad, and the pressure differential compares the difference between the pressure detected by the two pressure sensors positioned under the first footpad and the difference between the pressure detected by the two pressure sensors positioned under the second footpad.

12. The vehicle of claim 8, wherein the control circuit includes a PID controller.

13. The vehicle of claim 8, wherein the control signals for the first motor are different from the control signals for the second motor.

14. The vehicle of claim 8, wherein the control signals are pulse-width modulated (PWM) currents.

15. The vehicle of claim 8, wherein the control circuit further generates control signals to stop the vehicle.

16. The vehicle of claim 8, wherein the balance sensor is one or more of an accelerometer, a gyroscope, or a tilt sensor.

17. A method of controlling a personal transport vehicle comprising:
detecting a pressure applied by a driver on a platform of the vehicle using a plurality of pressure sensors;
comparing the pressure detected in a first footpad and in a second footpad and determining a pressure differential across the plurality of pressure sensors;
generating, based on the pressure differential, control signals for a first motor and a second motor to drive a first wheel and a second wheel to turn the vehicle.

18. The method of claim 17, further comprising detecting a tilt of the platform of the vehicle.

19. The method of claim 18, wherein the control signals are further based on the tilt of the platform of the vehicle.

20. The method of claim 17, wherein the control signals generated for the first motor are different from the control signals generated for the second motor.

21. The method of claim 17, wherein the control signals are pulse-width modulated (PWM) currents.

* * * * *